US012208500B2

(12) United States Patent
Liang

(10) Patent No.: US 12,208,500 B2
(45) Date of Patent: Jan. 28, 2025

(54) CONTROL DEVICE OF POWER TOOL

(71) Applicant: MOBILETRON ELECTRONICS CO., LTD., Taichung (TW)

(72) Inventor: Chih-Hsiang Liang, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 30 days.

(21) Appl. No.: 18/447,270

(22) Filed: Aug. 9, 2023

(65) Prior Publication Data

US 2024/0058936 A1 Feb. 22, 2024

(30) Foreign Application Priority Data

Aug. 18, 2022 (TW) ................................. 111131158

(51) Int. Cl.
*B25F 5/02* (2006.01)
*B25B 21/00* (2006.01)
*B25F 5/00* (2006.01)

(52) U.S. Cl.
CPC .............. *B25F 5/001* (2013.01); *B25B 21/00* (2013.01); *B25F 5/02* (2013.01)

(58) Field of Classification Search
USPC ............................................................ 173/2
See application file for complete search history.

(56) References Cited

U.S. PATENT DOCUMENTS 8,888,655 B2 11/2014 Saur
2005/0103510 A1 5/2005 Gass et al.
2014/0008090 A1* 1/2014 Kokinelis ................ B25F 5/02 29/428
2014/0015383 A1* 1/2014 Kokinelis .............. H02P 31/00 310/68 A (Continued)

FOREIGN PATENT DOCUMENTS

CN 212706493 U 3/2021
JP 4528789 B2 6/2010

(Continued)

OTHER PUBLICATIONS

Search Report for TW111131158, Issued on Jun. 16, 2023, Total of 3 page.

(Continued)

*Primary Examiner* — Chinyere J Rushing-Tucker
(74) *Attorney, Agent, or Firm* — Apex Juris, pllc; Hilde Coeckx

(57) ABSTRACT

A control device of a power tool includes a trigger mounting bracket, a control circuit board, a control trigger, and a direction-switching button. The control circuit board is disposed on the trigger mounting bracket and has a 3D Hall sensor. The control trigger has a first magnet and is disposed on the trigger mounting bracket to approach or move away from the 3D Hall sensor along a first axis. The direction-switching button has a second magnet and is disposed on the trigger mounting bracket to approach or move away from the 3D Hall sensor along a second axis. By detecting a (Continued)

variation of a magnetic field generated by different magnets in the first axis and the second axis when approaching or moving away from the 3D Hall sensor through the 3D Hall sensor, the power tool could be controlled to activate and switch directions.

12 Claims, 17 Drawing Sheets

(56) References Cited

U.S. PATENT DOCUMENTS

| | | | | |
|---|---|---|---|---|
| 2016/0250743 | A1 | 9/2016 | Kikuchi et al. | |
| 2021/0078146 | A1 | 3/2021 | Araki et al. | |
| 2021/0339372 | A1* | 11/2021 | Geiger .................... | B25F 5/006 |
| 2022/0040827 | A1 | 2/2022 | Fortoloczki et al. | |

FOREIGN PATENT DOCUMENTS

| | | | |
|---|---|---|---|
| TW | I758581 | B | 3/2022 |
| WO | 2019150651 | A1 | 8/2019 |
| WO | 2019208105 | A1 | 10/2019 |

OTHER PUBLICATIONS

English Abstract for CN208729640U, Total of 1 page.
English Abstract for CN212706493U, Total of 1 page.
English Abstract for TWI758581B, Total of 1 page.

* cited by examiner

CONTROL DEVICE OF POWER TOOL

BACKGROUND OF THE INVENTION

Technical Field

The present invention relates generally to a power tool, and more particularly to a control device of a power tool.

Description of Related Art

The power tool is provided for the user to operate and drive the workpiece. A control device of a conventional power tool for a user to operate includes an activating portion and a direction-switching portion, wherein the activating portion includes a start trigger and a start switch, and the direction-switching portion includes a direction-switching button and a direction-switching switch. The direction-switching portion allows the user to switch a rotating direction of a motor. The user can operate the direction-switching button to activate the direction-switching switch for switching. Subsequently, when the user presses the start trigger, it triggers the start switch, causing the motor of the power tool to rotate in the direction set by the user.

Conventional start switches and conventional direction-switching switches are mechanical switches with metal contacts. The metal contacts in the mechanical switches are prone to oxidation or contamination due to environmental factors, resulting in poor contact of the mechanical switches, which causes the power tool to malfunction and not operate properly.

BRIEF SUMMARY OF THE INVENTION

In view of the above, the primary objective of the present invention is to solve the problem that conventional mechanical switches are prone to poor contact.

The another objective of the present invention is to detect the operations of activating and direction switching by merely one 3D Hall sensor.

The present invention provides a control device of a power tool including a trigger mounting bracket, a control circuit board, a control trigger, and a direction-switching button. The control circuit board is fixed on the trigger mounting bracket, wherein a 3D Hall sensor is disposed on the control circuit board. A first magnet is disposed on the control trigger. The control trigger is movable on the trigger mounting bracket along a first axis, allowing the first magnet to approach or move away from the 3D Hall sensor along the first axis. The 3D Hall sensor detects a position of the first magnet and correspondingly generates a first signal. A second magnet is disposed on the direction-switching button. The direction-switching button is movable on the trigger mounting bracket along a second axis perpendicular to the first axis, allowing the second magnet to approach or move away from the 3D Hall sensor along the second axis. The 3D Hall sensor detects a position of the second magnet and correspondingly generates a second signal.

With the aforementioned design, the position of the first magnet and the second magnet could be detected by the 3D Hall sensor, thereby solving the problem of poor contact of the conventional mechanical switches due to the metal contacts of the conventional mechanical switches being easily oxidized or dirty. The strength of the magnetic field generated by different magnets in the first axis and the second axis when approaching or moving away from the 3D Hall sensor could be detected by merely one 3D Hall sensor, and the 3D Hall sensor correspondingly generates the first signal corresponding to the operations of the control trigger and the second signal corresponding to the operations that the direction-switching button sets the direction switching of the motor. In this way, the use of electronic components could be reduced to simplify the circuit.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
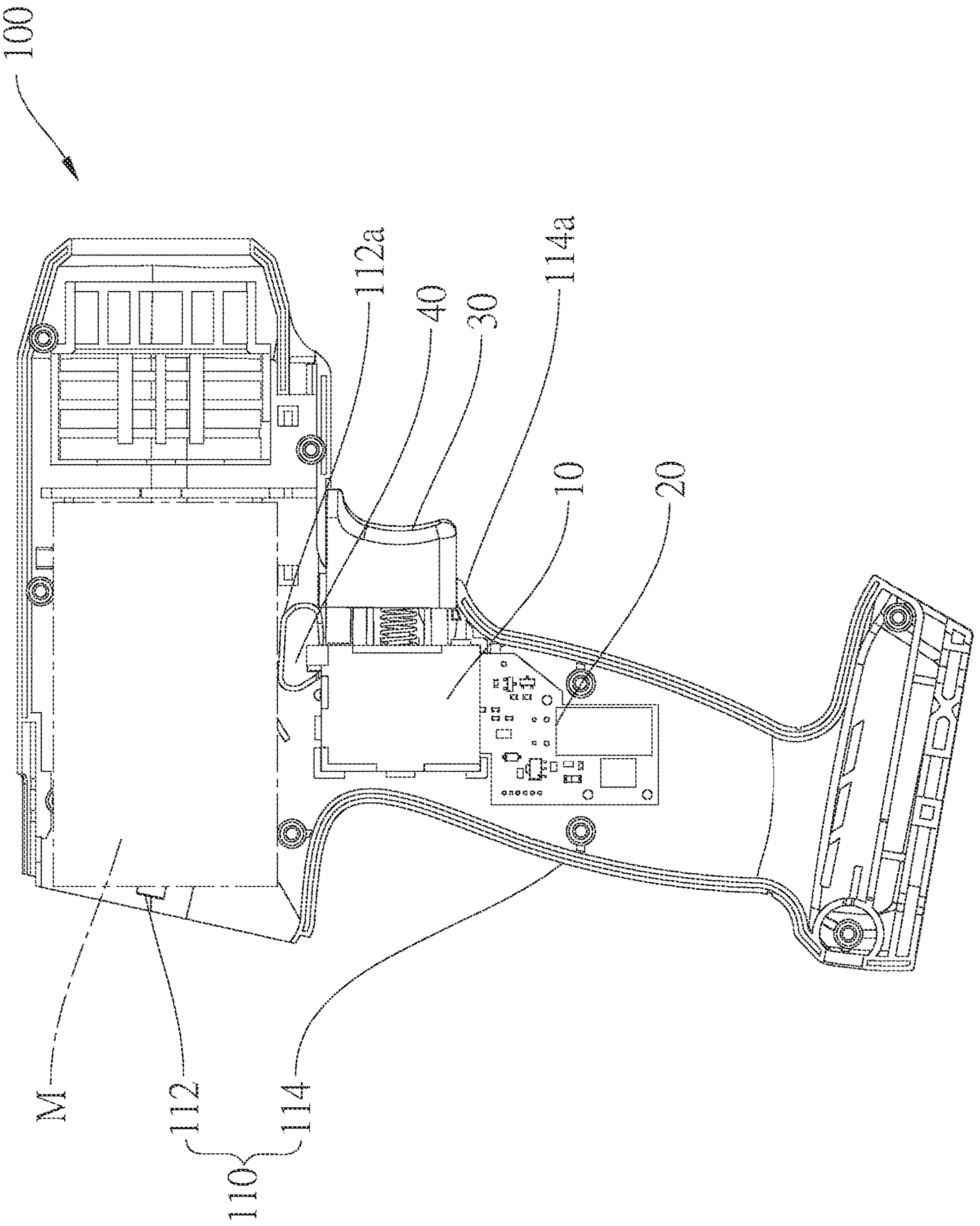
FIG. 1 is a schematic view of the power tool according to an embodiment of the present invention.
Figure 2:
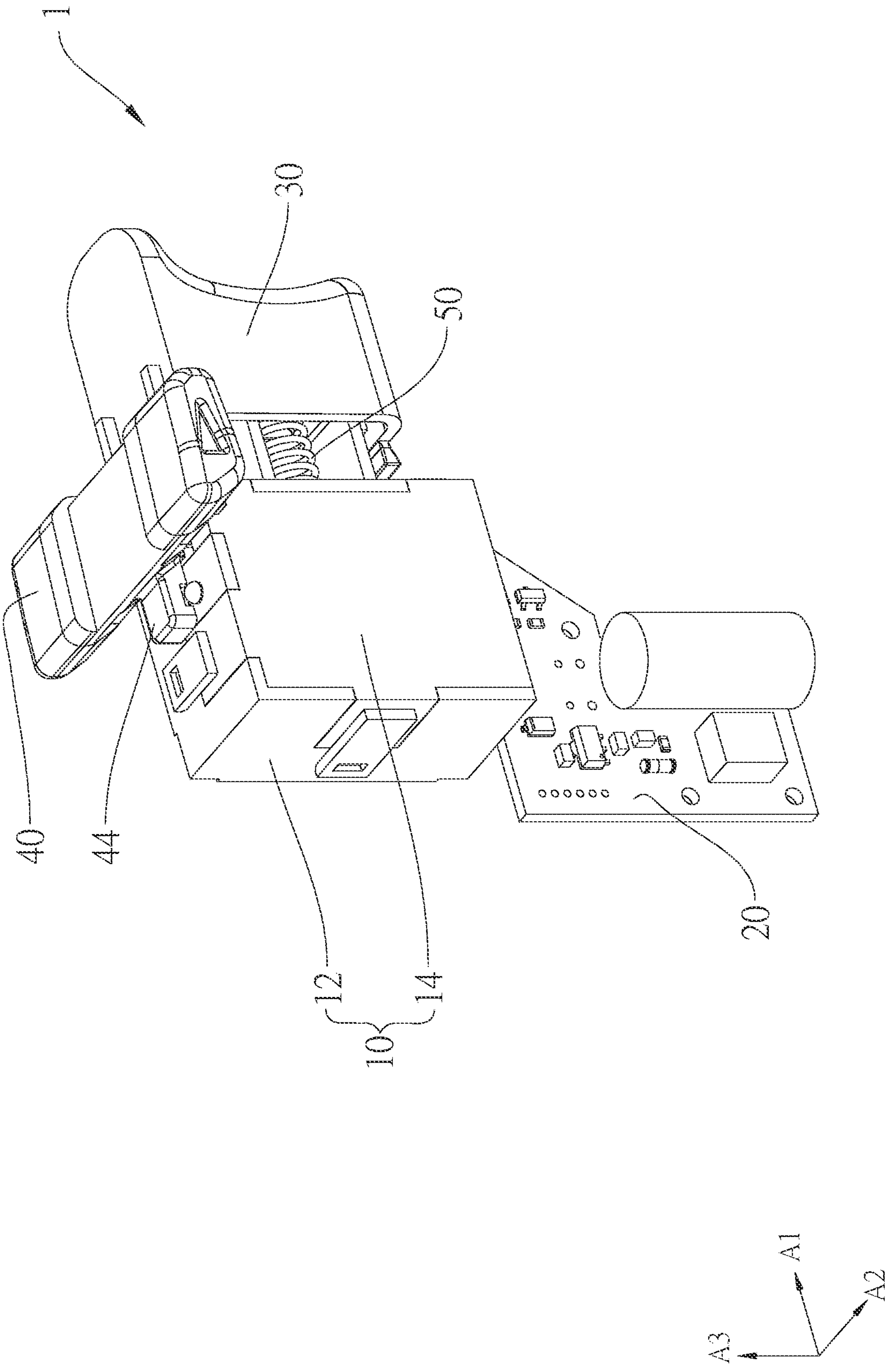
FIG. 2 is a perspective view of the control device of the power tool according to the embodiment of the present invention.
Figure 3:
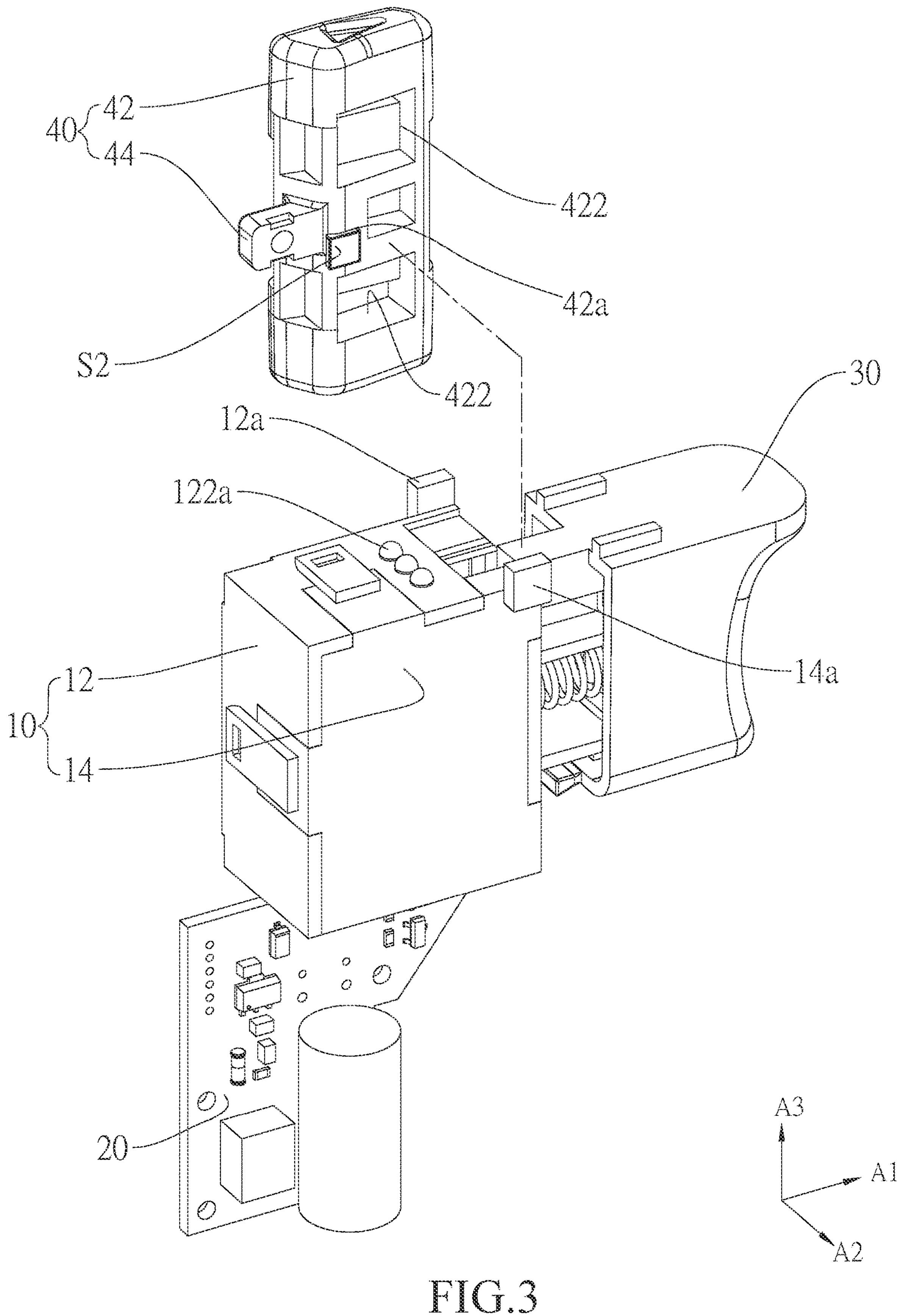
FIG. 3 is an exploded view of the partial components of the control device of the power tool according to the embodiment of the present invention.
Figure 4:
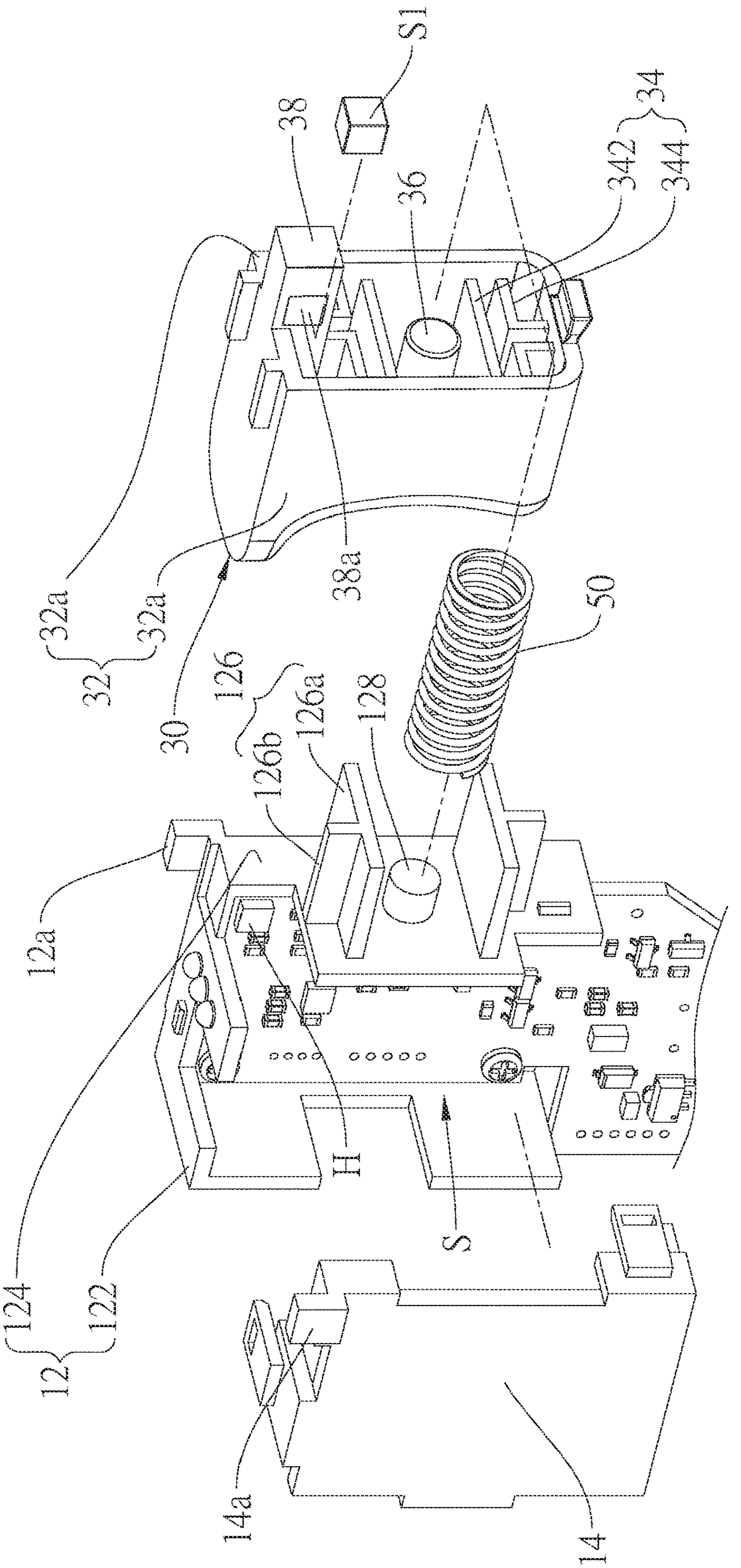
FIG. 4 is an exploded view of the partial components of the control device of the power tool according to the embodiment of the present invention.
Figure 5:
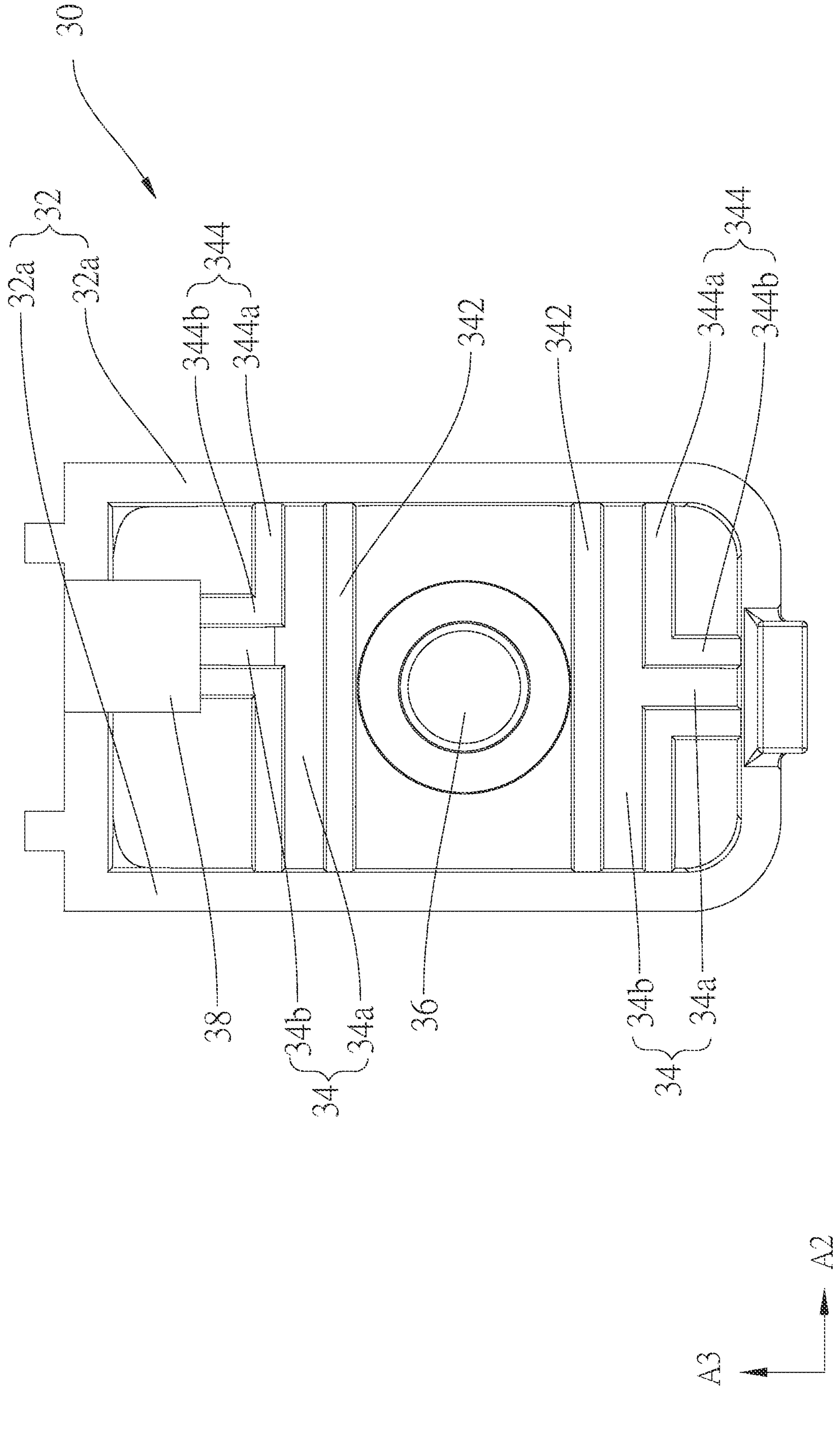
FIG. 5 is a perspective view of the control trigger of the control device of the power tool according to the embodiment of the present invention.
Figure 6:
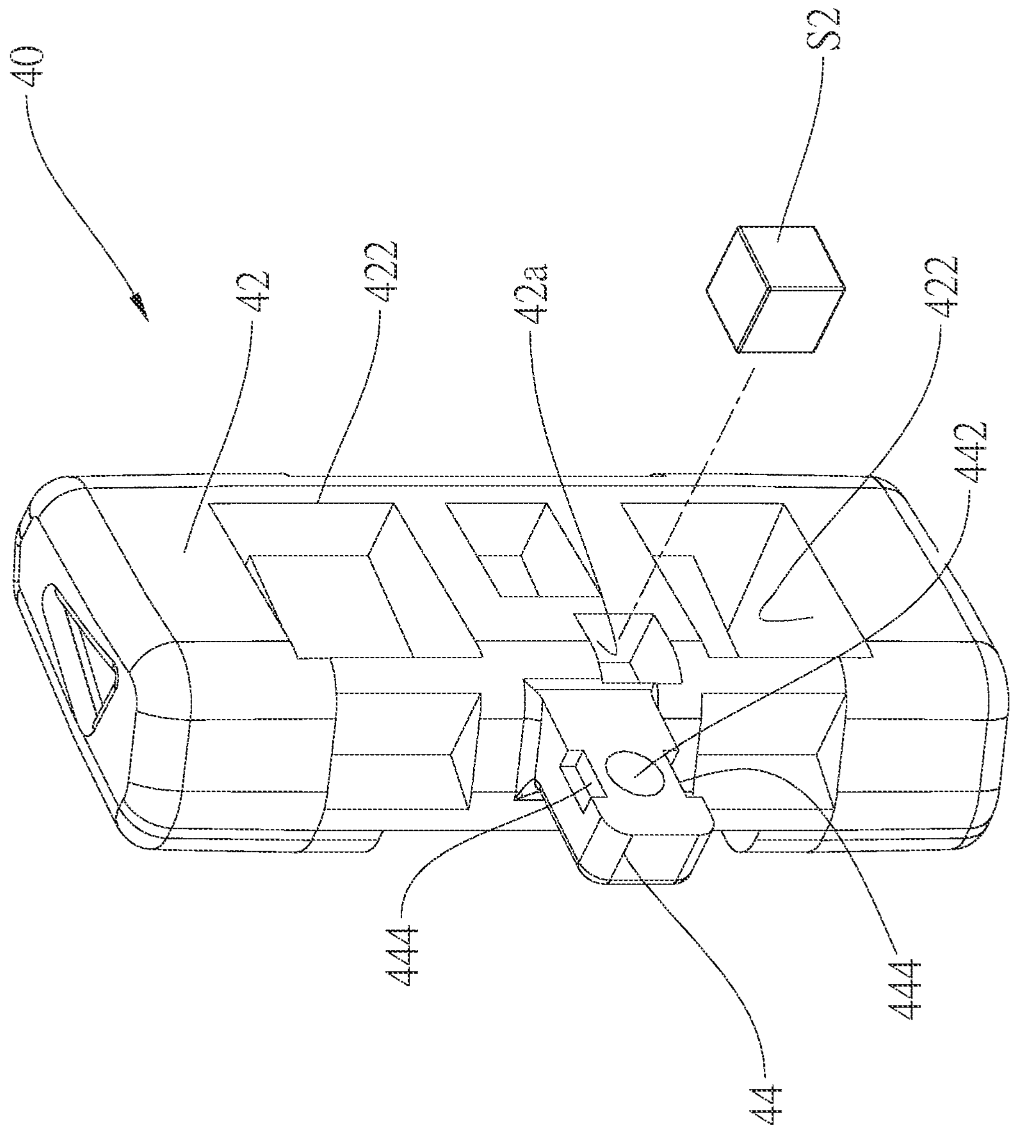
FIG. 6 is a perspective view of the direction-switching button of the control device of the power tool according to the embodiment of the present invention.

A power tool 100 having a control device 1 according to an embodiment of the present invention is illustrated in FIG. 1, wherein the power tool 100 could be an electric screwdriver, an electric wrench, an electric drill, or other tools capable of driving and rotating workpieces. The control device 1 is disposed on the power tool 100 and is adapted to activate a motor M of the power tool 100 and set a rotating direction of the motor M. Referring to FIG. 2 to FIG. 8, the control device 1 of the current embodiment includes a trigger mounting bracket 10, a control circuit board 20, a control trigger 30, and a direction-switching button 40.

The power tool 100 includes a case 110 and the motor M. The case 110 has a transmission portion 112 and a holding portion 114 extending downward from the transmission portion 112, wherein the motor M is disposed in the transmission portion 112, and the holding portion 114 is adapted to be held by a user. An inner space is formed between the transmission portion 112 and the holding portion 114, wherein an end of the inner space facing the holding portion 114 has a first through-hole 114*a*, and a second through-hole 112*a* is formed at a position of the transmission portion 112 close to the first through-hole 114*a*. The second through-hole 112*a* is arranged vertically relative to the first through-hole 114*a*. The control trigger 30 passes through the first through-hole 114*a* to be located at the holding portion 114 and is located below the transmission portion 112. The direction-switching button 40 passes through the second through-hole 112*a* to be located at the transmission portion 112. In order to illustrate easily, a first axis A1, a second axis A2, and a third axis A3 that are perpendicular to one another are defined.

The trigger mounting bracket 10 is disposed on the holding portion 114 of the case 110 and includes a first body 12 and a second body 14, wherein the first body 12 matches with the second body 14 along the second axis A2 to form a receiving space S therebetween. The trigger mounting bracket 10 includes a top plate 122 and a front plate 124 connected to the top plate 122 and facing a front of the case 110 of the power tool 100. The top plate 122 has a first positioning structure. In the current embodiment, the first positioning structure includes a plurality of bulges 122*a* arranged along the second axis A2, wherein a number of the bulges 122*a* is three as an example. However, the number of the bulges 122*a* could be two or more than two in other embodiments. A top portion of the top plate 122 has at least one restricting block protruding upward. In the current embodiment, the at least one restricting block includes two restricting blocks that are respectively a first restricting block 12*a* and a second restricting block 14*a* and are respectively located on the first body 12 and the second body 14. In other words, the first restricting block 12*a* and the second restricting block 14*a* are located on two opposite sides of the trigger mounting bracket 10 in the second axis A2.

In the current embodiment, at least one first guiding portion and a protruding member 128 are disposed on the front plate 124, wherein the at least one first guiding portion includes two first guiding portions that are respectively a guiding rail 126. The two guiding rails 126 are spaced by a distance in the third axis A3 and extend along the first axis A1. Each of the guiding rails 126 includes a horizontal plate 126*a* and a vertical plate 126*b*, wherein a surface of the horizontal plate 126*a* of one of the two guiding rails 126 faces a surface of the horizontal plate 126*a* of the other guiding rail 126, and the vertical plates 126*b* of the two guiding rails 126 are respectively and erectly disposed on another surface of the two horizontal plates 126*a*. The protruding member 128 is disposed between the two horizontal plates 126*a* and extends along the first axis A1. The vertical plate 126*b* of each of the guiding rails 126 extends in a direction away from the protruding member 128 along the third axis A3.

The control circuit board 20 is fixed on the trigger mounting bracket 10. In the current embodiment, a part of the control circuit board 20 is disposed in the receiving space S of the trigger mounting bracket 10, and another part of the control circuit board 20 is located out of the trigger mounting bracket 10. The control circuit board 20 has a threedimensional Hall sensor (hereafter called 3D Hall sensor H) and a controller C. In the current embodiment, the 3D Hall sensor H is located close to a junction between the top plate 122 and the front plate 124 and is close to one of the guiding rails 126. The 3D Hall sensor H is adapted to detect a variation of a magnetic field in the first axis A1 and the second axis A2 and to respectively output a first signal and a second signal, wherein the first signal and the second signal could be an analog signal or a digital signal. The controller C receives the first signal and the second signal outputted by the 3D Hall sensor H and controls the motor M to operate based on the first signal and the second signal.

The control trigger 30 is disposed on the trigger mounting bracket 10 and is located in the first through-hole 114*a* of the case 110, and could be moved back and forth along the first axis A1. A first magnet S1 is disposed on the control trigger 30 and correspondingly approaches or moves away from the 3D Hall sensor H along the first axis A1 as the control trigger 30 moves, so that the 3D Hall sensor H could detect a position of the first magnet S1 to correspondingly generate the first signal. The first signal has a corresponding parameter variation based on a variation of the position of the first magnet S1. For instance, the parameter variation of an analog signal could be a voltage variation, while the parameter variation of a digital signal could be a digital value variation.

In the current embodiment, the control trigger 30 has a trigger case 32, at least one second guiding portion, a restricting protrusion 36, and an extending arm 38, wherein the trigger case 32 has two side plates 32*a* spaced by a distance, and a space is formed between the two side plates 32*a*. In the current embodiment, the at least one second guiding portion includes two second guiding portions that are respectively a guiding slot 34 extending along the first axis A1, wherein each of the guiding slots 34 includes a horizontal section 34*a* and a longitudinal section 34*b*, and an end of the longitudinal section 34*b* communicates with the horizontal section 34*a*. The longitudinal sections 34*b* of the two guiding slots 34 face opposite directions, so that the two guiding slots 34 form an upper and lower symmetrical structure.

More specifically, each of the guiding slots 34 has a partition plate 342 and two bent plates 344, wherein the partition plate 342 is located in the space, and two lateral sides of the partition plate 342 are respectively connected to the two side plates 32*a*; the two bent plates 344 are located in the space and is adjacent to the partition plate 342; each of the bent plates 344 has a horizontal plate section 344*a* and a longitudinal plate section 344*b*; the two horizontal plate sections 344*a* are respectively connected to the two side plates 32*a*; the two horizontal plate section 344*a* and the partition plate 342 are spaced to form the horizontal section 34*a*; the two longitudinal plate section 344*b* face each other and are spaced to form the longitudinal section 34*b*.

The restricting protrusion 36 is located between the two partition plates 342 and extends along the first axis A1, wherein the restricting protrusion 36 and the protruding member 128 of the trigger mounting bracket 10 are located on the same axis.

An end of the extending arm 38 is connected to the trigger case 32 and is located above the upper one of the guiding slots 34. The extending arm 38 extends out of the trigger case 32 along the first axis A1 and has a first receiving groove 38*a* adapted to receive the first magnet S1 and located on a side of the extending arm 38 in the second axis A2.

The two guiding rails 126 on the front plate 124 of the trigger mounting bracket 10 enter the two guiding slot 34 respectively from an open end of the two guiding slot 34 of the control trigger 30, wherein the cooperative relationship between the guiding slot 34 and the guiding rails 126 mentioned above allows the control trigger 30 to move back and forth along the first axis A1. The horizontal plate 126*a* is located in the horizontal section 34*a*, and the vertical plate 126*b* is located in the longitudinal section 34*b*, thereby achieving stable positioning. In this way, the control trigger 30 could move between a first position P1 shown in FIG. 8 and a second position P2 shown in FIG. 9 on the guiding rails 126 of the trigger mounting bracket 10 along the first axis, thereby driving the first magnet S1 to approach or move away from the 3D Hall sensor H along the first axis A1.

Figure 8:
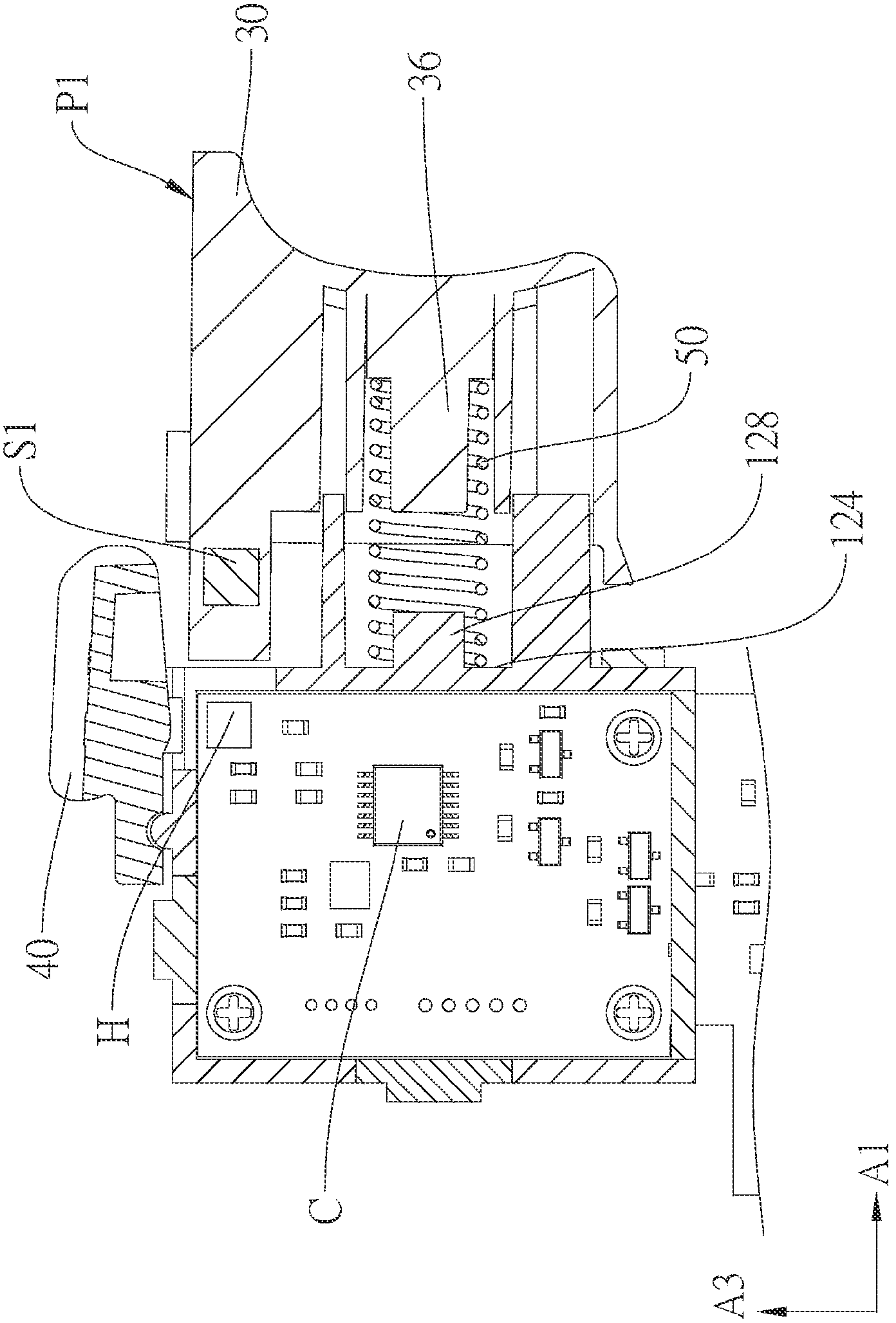
FIG. 8 is a sectional view along the 8-8 line in FIG. 7.
Figure 9:
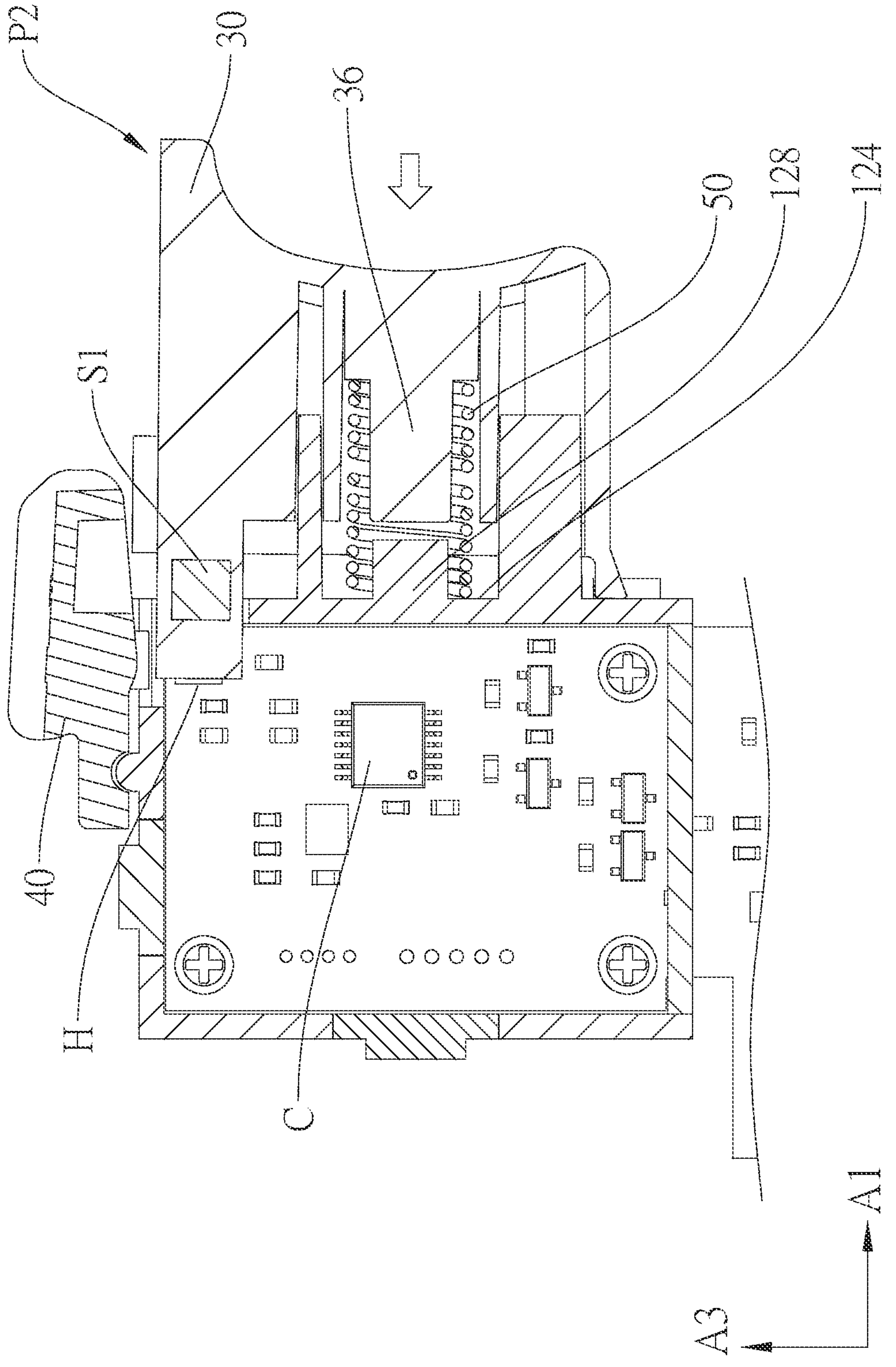
FIG. 9 is a sectional view showing the control trigger in FIG. 8 moving along the first axis and located at the second position.

A spring 50 is disposed between the control trigger 30 and the trigger mounting bracket 10 and fits around the restricting protrusion 36 and the protruding member 128, wherein two ends of the spring 50 respectively abut against a periphery of the restricting protrusion 36 of the control trigger 30 and a periphery of the protruding member 128 of the front plate 124. Referring to FIG. 8, when the control trigger 30 is at the first position P1 without external force, the first magnet S1 is kept away from the 3D Hall sensor H. Referring to FIG. 9, when an external force is exerted to move the control trigger 30 to the second position P2, the first magnet S1 approaches the 3D Hall sensor H, and the spring 50 is compressed to push the front plate 124 of the trigger mounting bracket 10, wherein the restricting protrusion 36 is adjacent to the protruding member 128 for avoiding a body of the spring 50 bent and offset, and the trigger case 32 abuts against the front plate 124 of the trigger mounting bracket 10. In practice, the restricting protrusion 36 could abut against the protruding member 128 when the control trigger 30 is moved to the second position P2. After the external force is released, the spring 50 rebounds and pushes the control trigger 30 back to the first position P1. In this way, the 3D Hall sensor H could detect the position of the first magnet S1 to correspondingly generate the first signal when the control trigger 30 is moved between the first position P1 and the second position P2.

The controller C determines the position of the first magnet S1 based on a parameter of the first signal generated by the 3D Hall sensor H. For instance, if the first signal is an analog signal, the parameter could be a voltage, and the controller C could determine the position of the first magnet S1 based on a magnitude of the voltage of the first signal, wherein when the control trigger 30 is at the first position P1, the first magnet S1 is away from the 3D Hall sensor H, so the voltage of the first signal generated by the 3D Hall sensor H is minimum or zero, and the controller C controls the motor M stop running; as the control trigger 30 gets closer to the second position P2, the first magnet S1 gets closer to the 3D Hall sensor H, the magnetic field sensed by the 3D Hall sensor H becomes stronger gradually, and the voltage of the first signal generated by the 3D Hall sensor H also gradually increases, thereby the controller C could control the motor M to perform corresponding actions according to the voltage of the first signal (e.g. make the rotation speed of the motor M be proportional to the voltage of the first signal). Similarly, if the first signal is a digital signal, the parameter could be a digital value, and the controller C could determine the position of the first magnet S1 based on a magnitude of the digital value to correspondingly control the motor M.

In the current embodiment, the first guiding portions of the trigger mounting bracket 10 are the guiding rails 126, and the second guiding portions of the control trigger 30 are the guiding slots 34. However, these are not a limitation of the present invention; in other embodiments, the first guiding portion and the second guiding portion could be any complementary shapes, and the number of the first guiding portion and the second guiding portion could also be one. The advantage of the two first guiding portions and the two second guiding portions is that the force could be evenly distributed, so that the movement of the control trigger 30 could be smoother.

The direction-switching button 40 is located above the top plate 122 of the trigger mounting bracket 10 and is located in the second through-hole 112*a* of the case 110. In the current embodiment, a position of the direction-switching button 40 in the first axis A1 and the third axis A3 could be restricted by the second through-hole 112*a* of the case 110, so the direction-switching button 40 could only move along the second axis A2. In practice, the second through-hole 112*a* could be disposed on the trigger mounting bracket 10, for instance, an extending portion with a through-hole could extend from a top of the trigger mounting bracket 10, wherein the through-hole is formed along the second axis A2 to receive the direction-switching button 40 and restrict the position of the direction-switching button 40 in the first axis A1 and the third axis A3.

The direction-switching button 40 has a button body 42 and a protruding arm 44, wherein the button body 42 is located in the second through-hole 112*a*, and a bottom of the button body 42 has a second receiving groove 42*a* and at least one restricting groove 422. A second magnet S2 is disposed in the second receiving groove 42*a*. In the current embodiment, the at least one restricting groove 422 includes two restricting grooves 422 respectively disposed on two sides of the second receiving groove 42*a*, wherein a width of each of the restricting grooves 422 in the second axis A2 is greater than a width of each of the restricting blocks (i.e., the first restricting block 12*a* and the second restricting block 14*a*) in the second axis A2. The two restricting grooves 422 are adapted to respectively receive the first restricting block 12*a* and the second restricting block 14*a* of the trigger mounting bracket 10. In this way, the cooperative relationship between the two restricting grooves 422 and both the first restricting block 12*a* and the second restricting block 14*a* could restrict a moving distance of the direction-switching button 40 in the second axis A2, preventing the button body 42 of the direction-switching button 40 from being pushed out of the second through-hole 112*a* of the case 110 along the second axis A2. An end of the protruding arm 44 is connected to the button body 42 and extends out of the button body 42 along the first axis A1. A positioning structure is disposed on a bottom of the protruding arm 44 and is adapted to match with the first positioning structure on the trigger mounting bracket 10 for positioning, thereby positioning the direction-switching button 40 at one of a plurality of positioning positions in the second axis A2, wherein the positioning positions are a first positioning position P1*a*, a second positioning position P2*a*, and a third positioning position P3*a*.

More specifically, the positioning structure includes a recess 442, so that the direction-switching button 40 could be positioned by engaging the recess 442 of the protruding arm 44 with one of the bulges 122*a*. Additionally, the positioning structure could further include at least one side notch 444. In the current embodiment, the at least one side notch 444 includes two side notches 444 located on two lateral sides of the recess 442 in the second axis A2 and formed at an edge of two lateral sides of the protruding arm 44. When the recess 442 is engaged with one of the bulges 122*a*, a part of another one of the bulges 122*a* that is adjacent to the bulge 122*a* engaged with the recess 442 is received in at least one of the side notches 444. By receiving a part of another one of the bulges 122*a* that is adjacent to the bulge 122*a* engaged with the recess 442 through the side notches 444, a width of the protruding arm 44 in the second axis A2 could increase to enhance the strength of the structure, and a distance between any two of the bulges 122*a* that are adjacent could be reduced, thereby reducing the distance that the direction-switching button 40 moves between the adjacent positioning positions.

Figure 7:
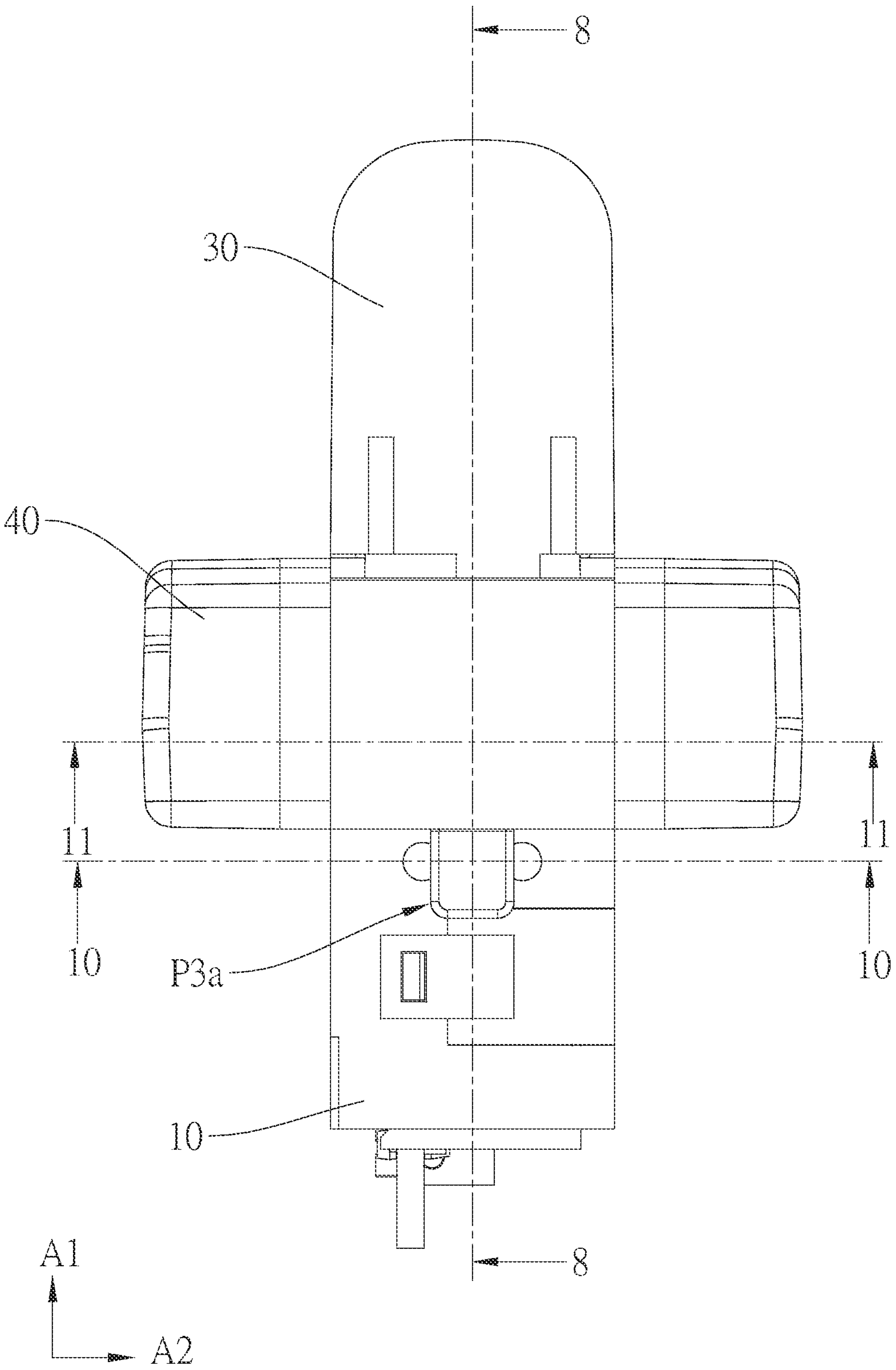
FIG. 7 is a top view of the control device of the power tool according to the embodiment of the present invention.
Figure 10:
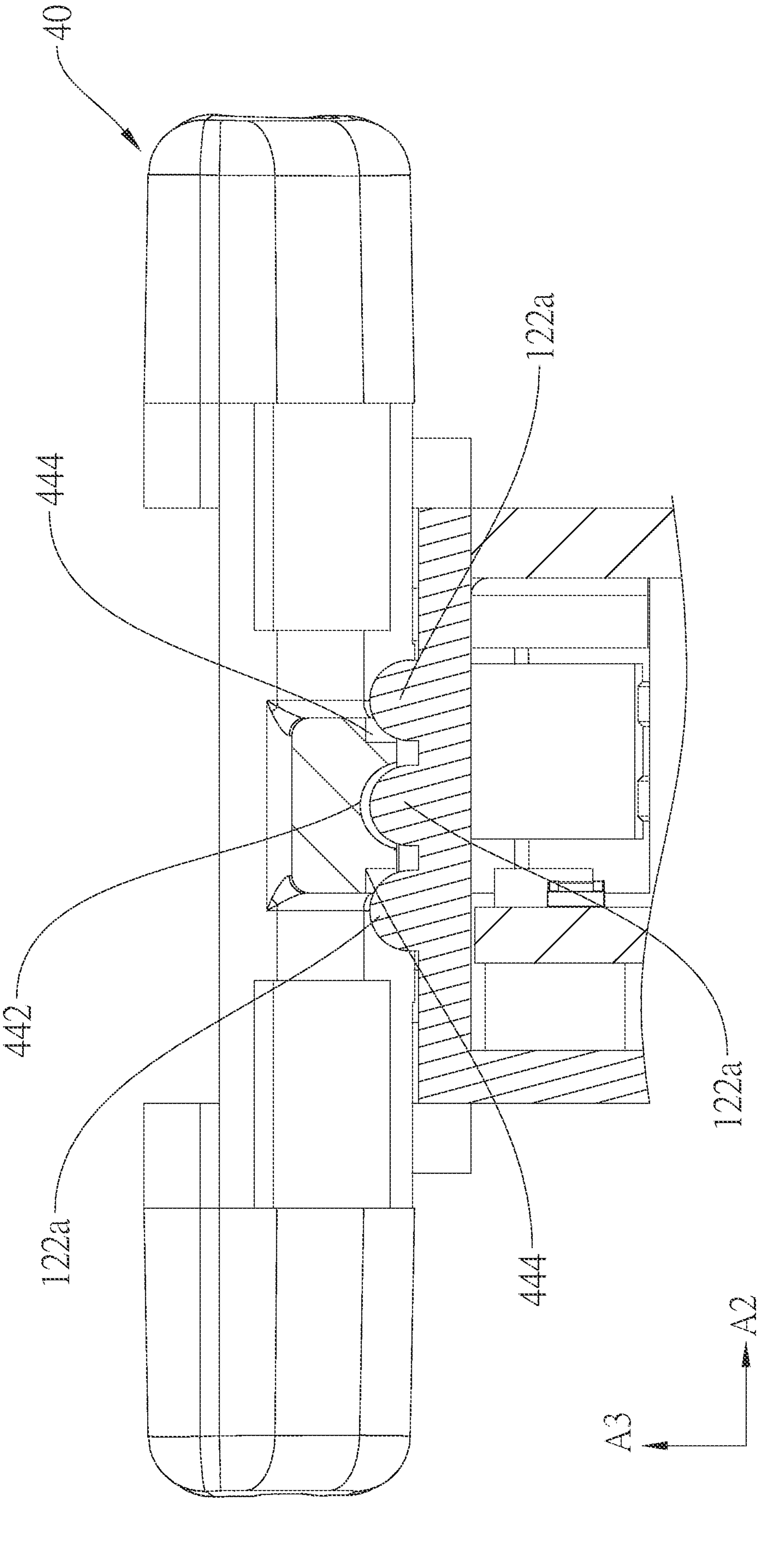
FIG. 10 is a sectional view along the 10-10 line in FIG. 7.
Figure 11:
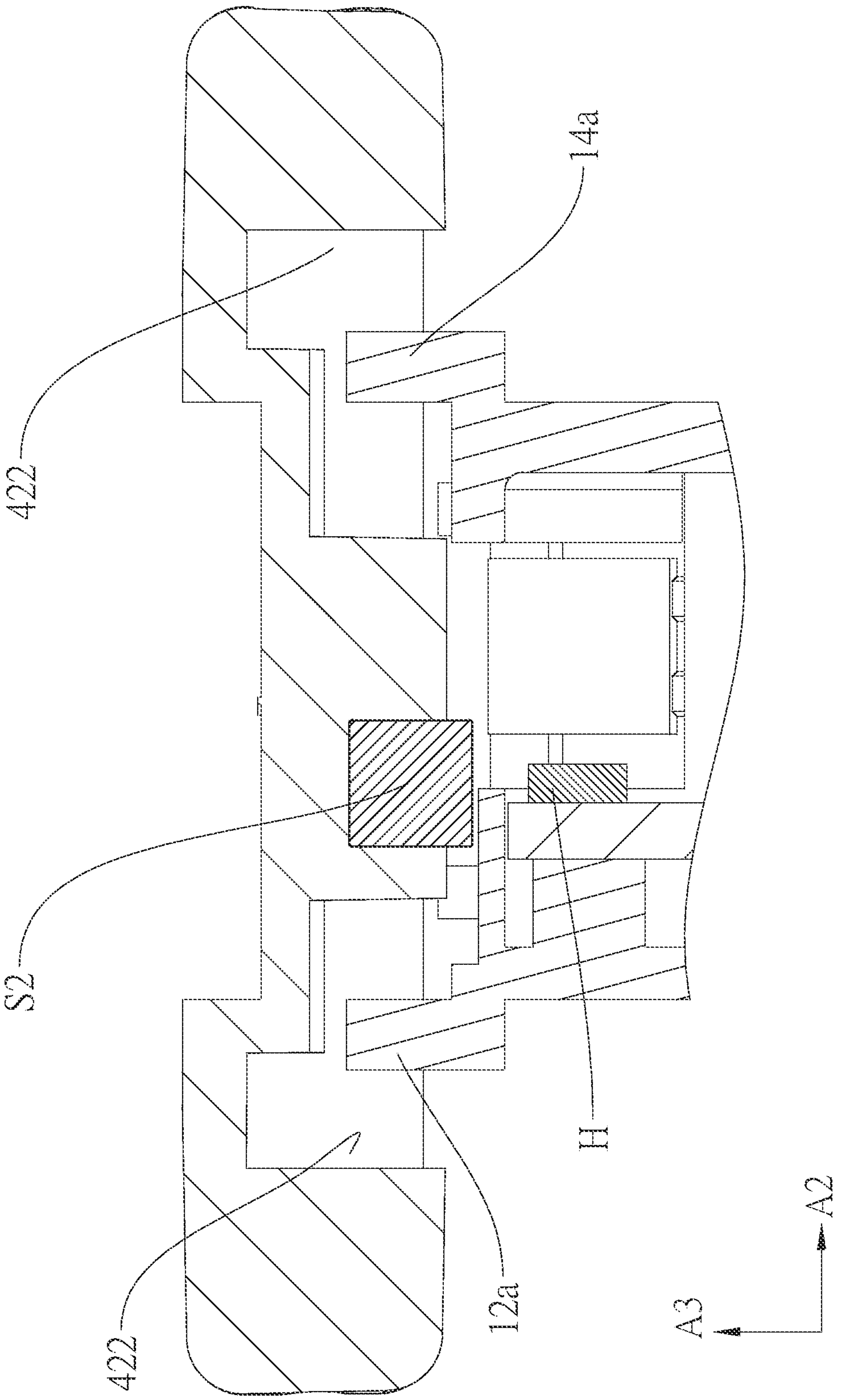
FIG. 11 is a sectional view along the 11-11 line in FIG. 7.

The direction-switching button 40 located at the third positioning position P3*a* is illustrated in FIG. 7, FIG. 10, and FIG. 11, at this time, the recess 442 of the positioning structure is engaged with the middle one of the bulges 122*a*, and the two side notches 444 respectively receive a part of the bulges 122*a* located on two lateral sides of the bulge 122*a* in the middle; the first restricting block 12*a* and the second restricting block 14*a* are respectively received in the two restricting grooves 422; the second magnet S2 is located directly above the 3D Hall sensor H, wherein the 3D Hall sensor H detects a position of the second magnet S2 and correspondingly generates the second signal; if the second signal is an analog signal, a parameter of the second signal is a voltage; if the second signal is a digital signal, a parameter of the second signal is a digital value. In this way, the controller C could determine the position of the second magnet S2 based on the parameter of the second signal.

Figure 12:
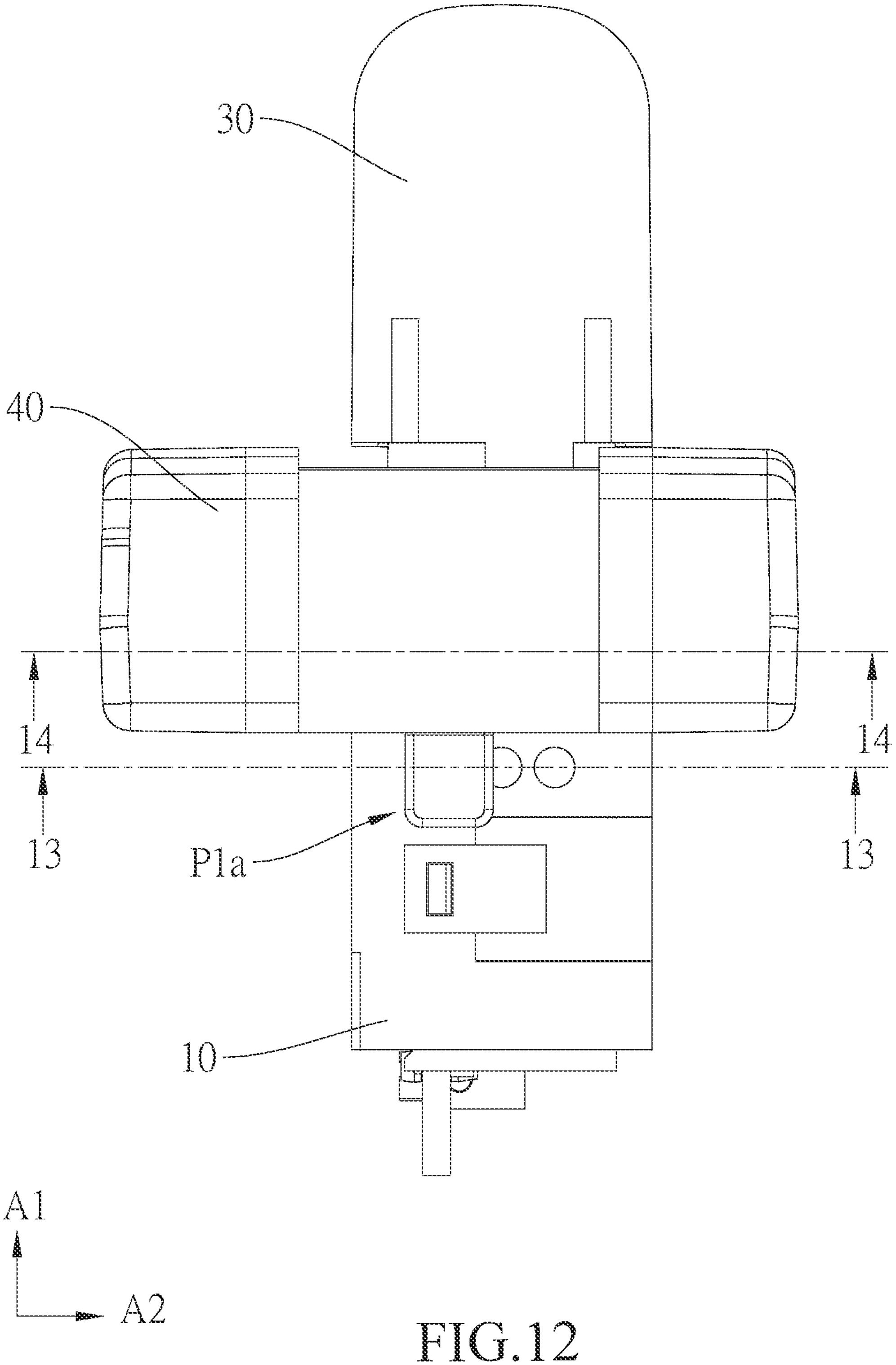
FIG. 12 is a top view of the control device of the power tool according to the embodiment of the present invention.
Figure 13:
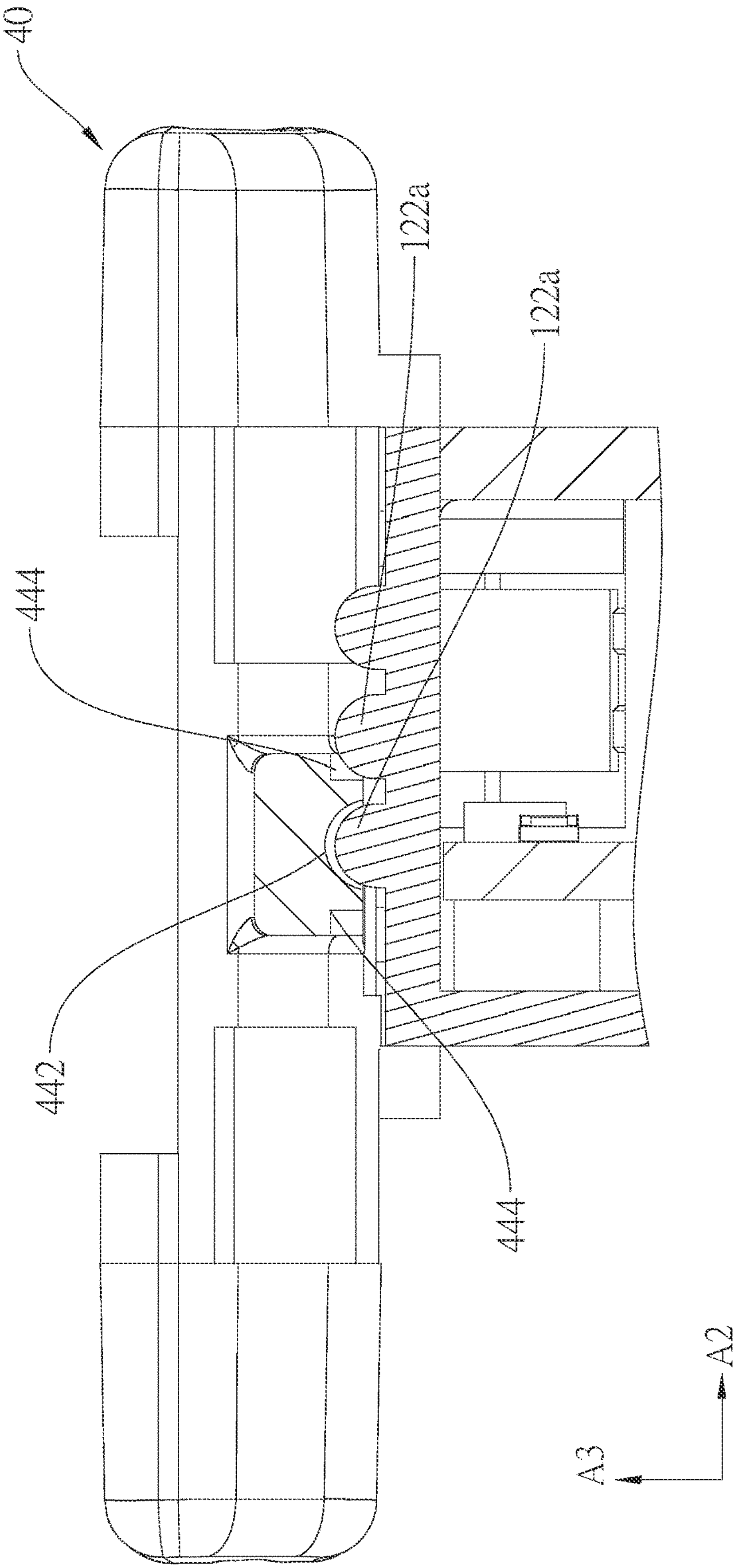
FIG. 13 is a sectional view along the 13-13 line in FIG. 12.
Figure 14:
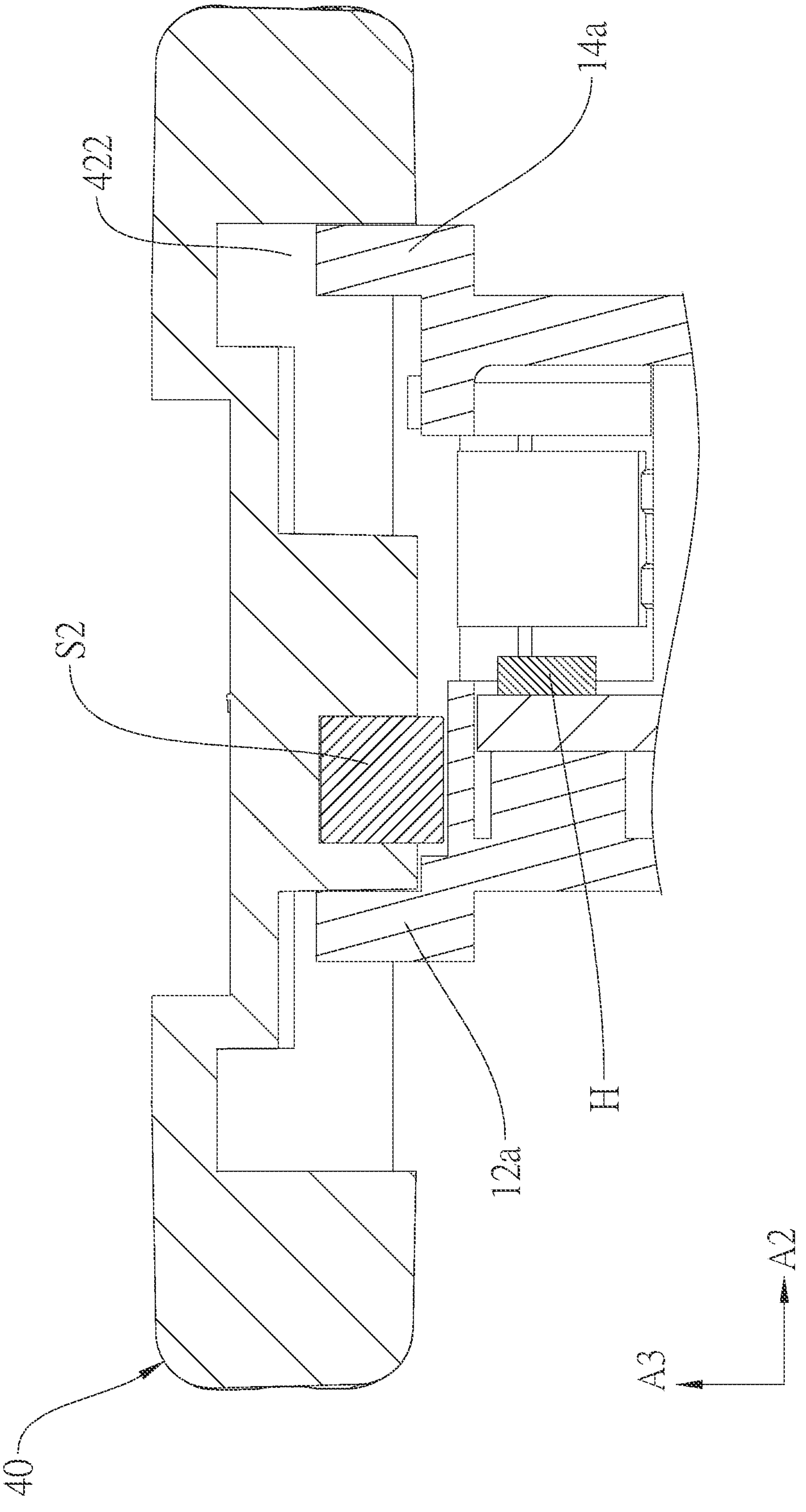
FIG. 14 is a sectional view along the 14-14 line in FIG. 12.

The direction-switching button 40 located at the first positioning position P1*a* is illustrated in FIGS. 12-14, at this time, the recess 442 of the positioning structure is engaged with the left one of the bulges 122*a*, the side notch 444 on the right receives a part of the bulge 122*a* in the middle, and the second restricting block 14*a* abuts against a side wall of the restricting groove 422 on the right, thereby restricting the direction-switching button 40 from moving leftward; the second magnet S2 is located on the upper left side of the 3D Hall sensor H; the 3D Hall sensor H could detect the position of the second magnet S2 and correspondingly generates the second signal, and the controller C could determine the position of the second magnet S2 based on the parameter of the second signal.

Figure 15:
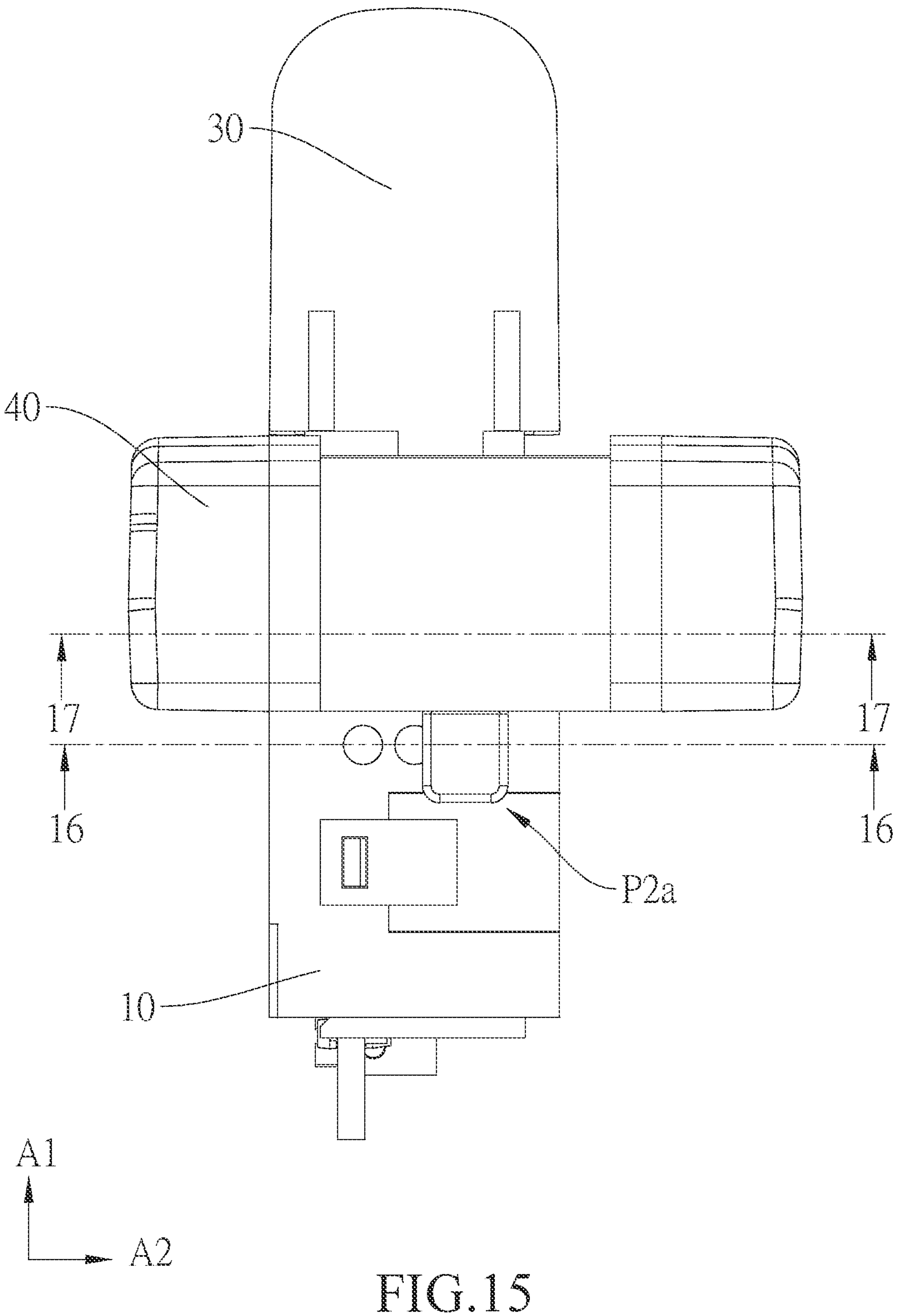
FIG. 15 is a top view of the control device of the power tool according to the embodiment of the present invention.
Figure 16:
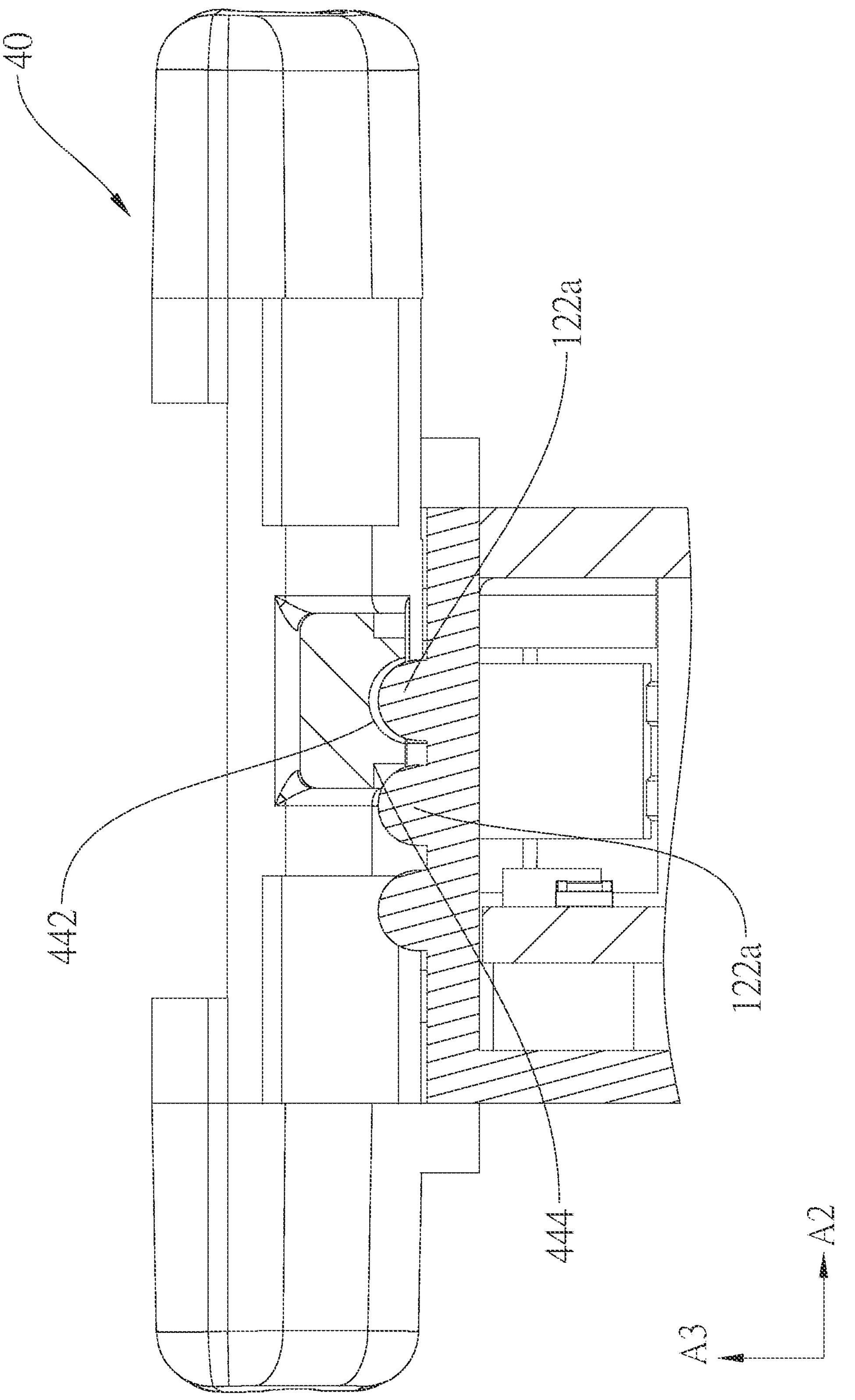
FIG. 16 is a sectional view along the 16-16 line in FIG. 15.
Figure 17:
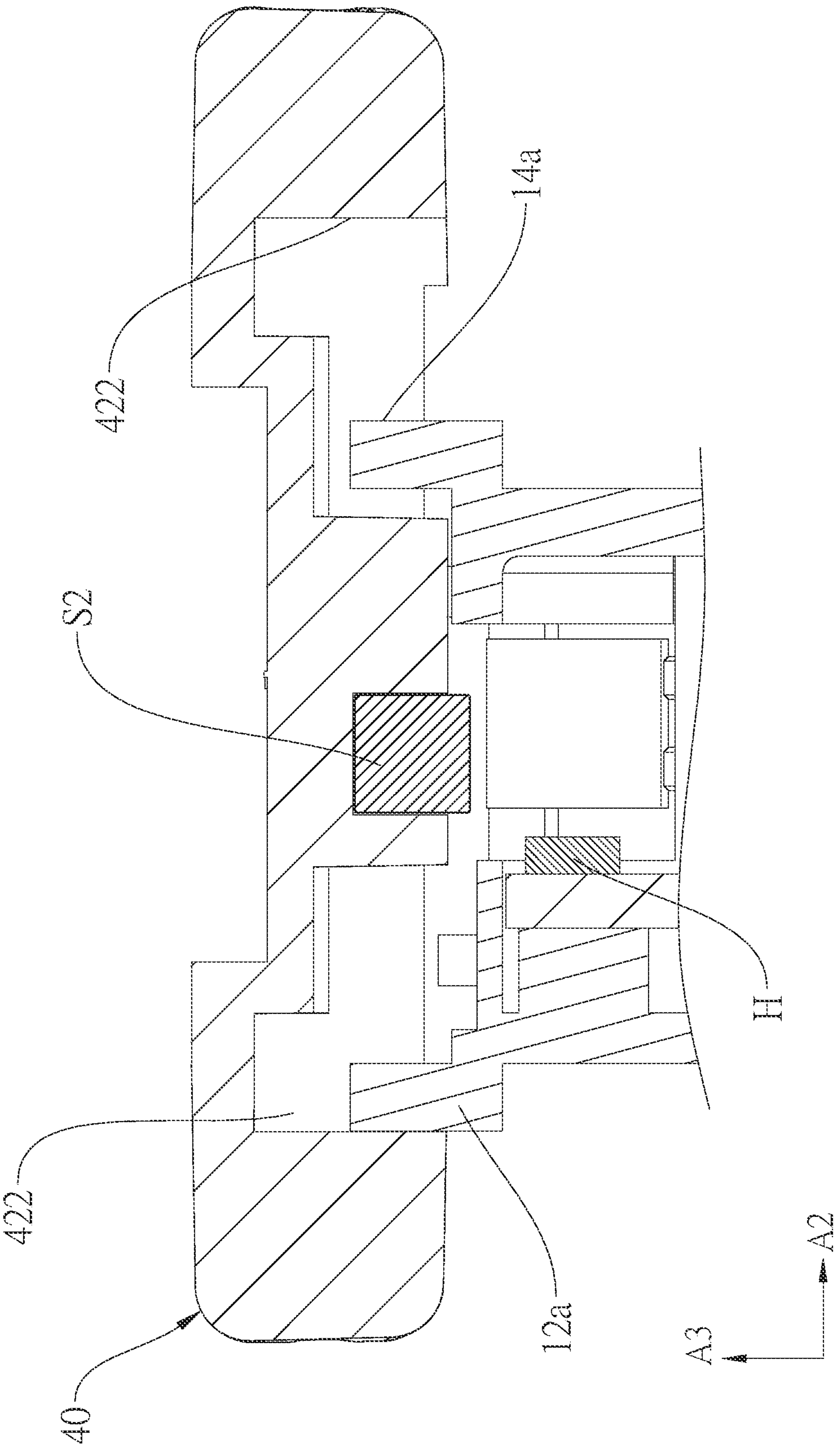
FIG. 17 is a sectional view along the 17-17 line in FIG. 15.

The direction-switching button 40 located at the second positioning position P2*a* is illustrated in FIGS. 15-17, at this time, the recess 442 of the positioning structure is engaged with the right one of the bulges 122*a*, the side notch 444 on the left receives a part of the bulge 122*a* in the middle, and the first restricting block 12*a* abuts against a side wall of the restricting groove 422 on the left, thereby restricting the direction-switching button 40 from moving rightward; the second magnet S2 is located on the upper right side of the 3D Hall sensor H; the 3D Hall sensor H could detect the position of the second magnet S2 and correspondingly generates the second signal, and the controller C could determine the position of the second magnet S2 based on the parameter of the second signal.

By positioning the direction-switching button 40 at the first positioning position P1*a*, the second positioning position P2*a*, or the third positioning position P3*a*, the second signal could be correspondingly generated based on the different positions of the second magnet S2. In other words, the parameter of the second signal on the three positioning positions would be different, so the controller C could determine that the direction-switching button 40 is located at the first positioning position P1*a*, the second positioning position P2*a*, or the third positioning position P3*a* based on the parameter of the second signal. When designing a program code of the controller C, it is possible to predefine that the direction-switching button 40 performs three different functions respectively when it is located at the three positioning positions; for example, a first function: when the direction-switching button 40 is located at the first positioning position P1*a*, a rotating direction of the motor M could be set as a forward rotation direction, and the controller C controls the motor M to rotate forward when the control trigger 30 is pressed; a second function: when the direction-switching button 40 is located at the second positioning position P2*a*, a rotating direction of the motor M could be set as a reverse direction, and the controller C controls the motor M to reverse when the control trigger 30 is pressed; and a third function: when the direction-switching button 40 is located at the third positioning position P3*a*, it could be set as a locking function, and the controller C does not control the rotation of the motor M when the control trigger 30 is pressed.

In practice, when the number of the bulges 122*a* is two, the controller C could provide said first function and said second function to set the rotating direction of the motor M as forward or reverse.

With the aforementioned design, the operations of the control trigger 30 and the direction-switching button 40 could be detected by only one 3D Hall sensor H of the control circuit board 20, which could not only solve the problem of poor contact of the conventional mechanical switches, but also reduce the use of electronic components to simplify the circuit.

It must be pointed out that the embodiments described above are only some preferred embodiments of the present invention. All equivalent structures which employ the concepts disclosed in this specification and the appended claims should fall within the scope of the present invention.

What is claimed is:

1. A control device of a power tool, comprising:

a trigger mounting bracket;

a control circuit board fixed on the trigger mounting bracket, wherein a 3D Hall sensor is disposed on the control circuit board;

a control trigger, wherein a first magnet is disposed on the control trigger; the control trigger is movable on the trigger mounting bracket along a first axis, allowing the first magnet to approach or move away from the 3D Hall sensor along the first axis; the 3D Hall sensor detects a position of the first magnet and correspondingly generates a first signal;

a direction-switching button, wherein a second magnet is disposed on the direction-switching button; the direction-switching button is movable on the trigger mounting bracket along a second axis perpendicular to the first axis, allowing the second magnet to approach or move away from the 3D Hall sensor along the second axis; the 3D Hall sensor detects a position of the second magnet and correspondingly generates a second signal.

2. The control device as claimed in claim 1, wherein the trigger mounting bracket has at least one first guiding portion, and the control trigger has at least one second guiding portion; the at least one second guiding portion is movably engaged with the at least one first guiding portion, allowing the control trigger to move between a first position and a second position along the at least one first guiding portion.

3. The control device as claimed in claim 2, wherein the at least one first guiding portion is a guiding rail, and the at least one second guiding portion is a guiding slot; the guiding slot has an open end; the guiding rail enters the guiding slot from the open end.

4. The control device as claimed in claim 3, wherein the guiding rail comprises a horizontal plate and a vertical plate erectly disposed on the horizontal plate; the guiding slot comprises a horizontal section and a longitudinal section; an end of the longitudinal section communicates with the horizontal section; when the guiding rail enters the guiding slot, the horizontal plate is located in the horizontal section, and the vertical plate is located in the longitudinal section.

5. The control device as claimed in claim 4, wherein the control trigger has a trigger case, a partition plate, and two bent plates; the trigger case has two side plates spaced by a distance to form a space between the side plates; the partition plate is located in the space, and two lateral sides of the partition plate are respectively connected to the two side plates; the two bent plates are located in the space and is adjacent to the partition plate; each of the bent plates has a longitudinal plate section and a horizontal plate section; the longitudinal plate section of one of the bent plates faces the longitudinal plate section of the other one of the bent plates and is spaced from the longitudinal plate section of the other one of the bent plates to form the longitudinal section; the horizontal plate section of each of the bent plates is connected to one of the side plates and is spaced from the partition plate to form the horizontal section.

6. The control device as claimed in claim 2, wherein the at least one first guiding portion comprises two first guiding portions, and the at least one second guiding portion comprises two second guiding portions.

7. The control device as claimed in claim 6, further comprising a spring, wherein the control trigger has a restricting protrusion located between the two second guiding portions; the trigger mounting bracket has a protruding member located between the two first guiding portions and being on a same axis with the restricting protrusion; the spring fits around the restricting protrusion and the protruding member; when the control trigger is moved from the first position to the second position, the spring is compressed, and when the control trigger is located at the second position, the restricting protrusion is adjacent to the protruding member.

8. The control device as claimed in claim 2, wherein the control trigger has a trigger case and an extending arm; an end of the extending arm is connected to the trigger case, extends along the first axis, and is provided with the first magnet.

9. The control device as claimed in claim 1, wherein the trigger mounting bracket has a first positioning structure; the direction-switching button has a positioning structure adapted to match with the first positioning structure for positioning, allowing the direction-switching button to be positioned at one of a plurality of positions in the second axis.

10. The control device as claimed in claim 9, wherein the first positioning structure comprises a plurality of bulges arranged along the second axis; the direction-switching button has a button body and a protruding arm; an end of the protruding arm is connected to the button body and extends along the first axis; the positioning structure is disposed on the protruding arm and has a recess engaging with one of the plurality of bulges.

11. The control device as claimed in claim 10, wherein the positioning structure has at least one side notch located adjacent to the recess in the second axis; when the recess is engaged with one of the plurality of bulges, a part of another one of the plurality of bulges that is adjacent to the bulge engaged with the recess is received in the at least one side notch.

12. The control device as claimed in claim 10, wherein the button body is located above the trigger mounting bracket and has at least one restricting groove; a top of the trigger mounting bracket has at least one restricting block protruding upward; the at least one restricting block enters the at least one restricting groove; a width of the at least one restricting groove in the second axis is greater than a width of the at least one restricting block in the second axis; the at least one restricting groove matches with the at least one restricting block to restrict a distance that the direction-switching button moves along the second axis.

* * * * *